(12) United States Patent
Schwesig

(10) Patent No.: US 6,495,986 B2
(45) Date of Patent: Dec. 17, 2002

(54) SAFE SPEED MONITORING FOR SENSOR-FREE THREE-PHASE DRIVES

(75) Inventor: Guenter Schwesig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/918,003

(22) Filed: Jul. 30, 2001

(65) Prior Publication Data

US 2002/0063548 A1 May 30, 2002

(30) Foreign Application Priority Data

Nov. 29, 2000 (DE) .......................................... 100 59 172

(51) Int. Cl.$^7$ ............................................... H02P 7/00
(52) U.S. Cl. ........................ 318/801; 318/802; 318/811; 318/782
(58) Field of Search ................................ 318/254, 439, 318/615, 782, 801, 802, 811

(56) References Cited

U.S. PATENT DOCUMENTS 4,291,265 A * 9/1981 Kawada et al. ............. 318/782
5,650,708 A * 7/1997 Sawada et al. ............. 318/801

* cited by examiner

*Primary Examiner*—Khanh Dang
(74) *Attorney, Agent, or Firm*—Baker Botts LLP

(57) ABSTRACT

The present invention makes possible a safety function for speed monitoring in the case of all induction machines operated on an inverter without a sensor system, in that a determined setpoint stator frequency value ($\phi_s$*) is limited and monitored in a two-channel mode in two systems with approximate redundancy, deriving from this in each system respective sets of control signals for the electrical valves of the inverter, which can be compared with one another in two systems of monitoring electronics. In the event of fault detection, two-channel switching off takes place. The circuit arrangement according to the invention can additionally be subjected to enforced dynamization.

14 Claims, 4 Drawing Sheets

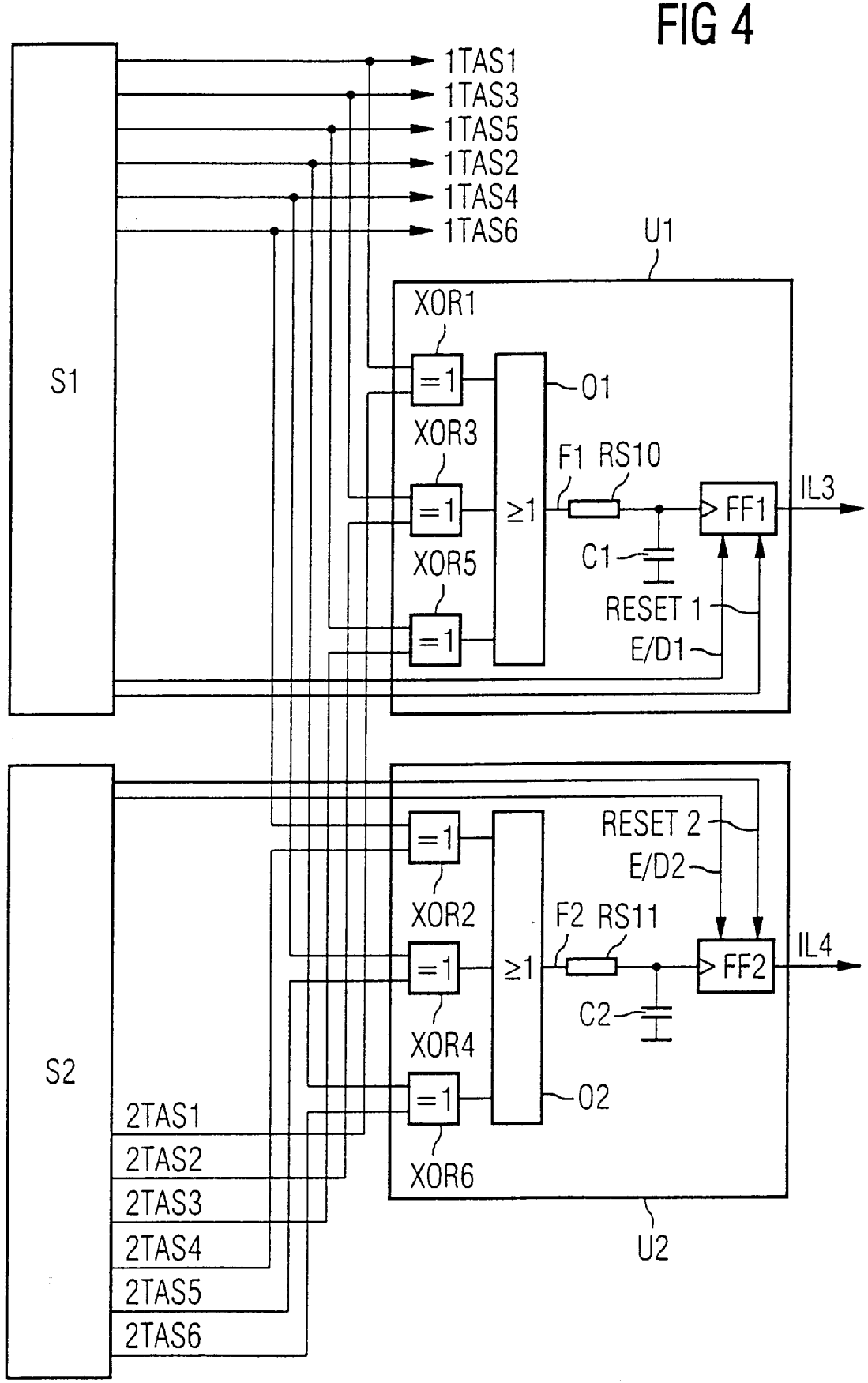

SAFE SPEED MONITORING FOR SENSOR-FREE THREE-PHASE DRIVES

FIELD OF THE INVENTION

The invention relates to a drive controller for position and speed sensing for a three-phase motor without an integrated sensor system by means of an inverter. The inverter has electrical valves in bridge connection.

BACKGROUND OF THE INVENTION

When electrical drives are used in industrial automation technology, for example in the case of numerically controlled machine tools and robots, it is a prerequisite to provide the greatest possible protection for man and machine. With a "safe speed" function for the motor, it is intended to ensure that the electrical machine or motor remains controllable even in the event of a fault, with the result that, as far as possible, it cannot perform any hazardous movements.

Corresponding safety functions have so far been used mainly in the area of machine tools. One element conventionally forming the basis for the safety functions is a sensor system integrated in the motor for position and speed sensing. In other areas, for example, production machines etc., such safety functions are likewise becoming of greater interest. In these areas, usually sensor-free three-phase motors are used in connection with what are known as frequency inverters. However, such sensor-free, three-phase motors have not so far offered any significant safety functions. To date, only a "safe stopping" function has been used, in which the driving signals for the power transistors are "safely" inhibited, which prevents unwanted re-starting of the motor. One skilled in the art refers to this by the term "pulse inhibit".

The word "safe" is intended here to express the idea that the respective requirements stipulated by the employers' liability insurance associations and their institutes for safety at work are satisfied. In this respect, there is a need with regard to fault detection for the protection of man and machine for such sensor-free, three-phase drives also to be provided with the "safe speed" function. Previous attempts to implement such a function have not been successful in respect of the accuracy or dynamics of the speed sensed (or calculated from current and voltage). To date, there has also not been any satisfactory solution found to the problem of recovering the stator frequency from the transistor driving signals for driving an inverter. It is therefore the object of the invention to provide a drive controller with safe speed monitoring for sensor-free three-phase drives.

SUMMARY OF THE INVENTION

According to the present invention, the aforesaid object is achieved by a drive controller for a three-phase motor which utilizes an inverter. The inverter has a first and a second system for generating a first set and second set of redundant control signals, to promote trouble-free operation for the electrical valves of the inverter. One system has a setpoint speed value applied to it, on the basis of which an essentially proportional setpoint frequency value can be derived for generating the first set of control signals, which can be provided for the other system via a communication interface for generating the second set of control signals. The respective setpoint frequency value in the respective system can be limited and/or can be monitored, wherein two fault detecting means are provided for monitoring the first and second sets of control signals, so that it is possible for a subset of corresponding control signals of the first and second sets of control signals to be compared with one another in the first fault detecting means and the remaining corresponding control signals of the first and second sets of control signals to be compared with one another in the second fault detecting means. In the case of corresponding control signals deviating from one another, the electrical valves of the inverter can be switched off in a two-channel mode by the respective fault detecting means.

If the inverter has electrical valves in bridge connection, it has been found to be particularly advantageous if, in the case of corresponding control signals deviating from one another, the pulses for the upper bridge arm of electrical valves can be inhibited by one fault detecting means and the pulses for the lower bridge arm of electrical valves can be inhibited by the other fault detecting means. In this case, it has been shown to be particularly effective for technical implementation if the setpoint stator frequency value, respectively, serves as the setpoint value essentially proportional to the setpoint speed value for generating the two sets of control signals.

A further preferred embodiment of the drive controller according to the present invention, is its application in an asynchronous motor, in which the system to which the setpoint speed value is applied comprise an arithmetical and logical means with an integrated speed controller. With knowledge of the motor data, the system supplies, on the basis of the setpoint speed value and the respective actual phase current values, not only the respective setpoint stator frequency value but also the respective setpoint slip frequency value, setpoint stator voltage value and load angle in the rotor flux system of coordinates. Based on this system, respective setpoint phase voltage values for driving a respective control unit for generating respective control signals can be generated by means of respective closed-loop control components of the two systems. In the case of a synchronous motor, the procedure is the same except that the slip frequency values are equal to zero for system-related reasons.

If the first fault detecting means monitors the corresponding control signals for the electrical valves of the upper bridge arm and the second fault detecting means monitors the corresponding control signals for the electrical valves of the lower bridge arm, a particularly simple fault detecting means can be achieved, and achieved particularly well when each fault detecting means performs a logic exclusive-OR operation on corresponding control signals that monitor the electrical valves. Thereafter, the results are logically combined to form a cumulative fault signal.

In a particularly low-cost technical implementation of the present invention, only one set of control signals for driving the electrical valves of the inverter is used.

By using respective optocouplers serving for the transmission of control signals to the electrical valves and a fault detecting means which allows the supply voltage of the optocouplers associated with the assigned control signals to be interrupted in the event of a fault, the safety of the drive controller can be further enhanced while the technical expenditure for switching off the control signals can be minimized. This system can be further simplified by a fault detecting means which allows the supply voltage of the optocouplers associated with the respectively assigned bridge arm to be interrupted in the event of a fault.

The safety of the arrangement according to the invention can be further increased by providing a means for enforced dynamization of the two pulse inhibiting paths. An interference signal can be applied to the setpoint value for generating the sets of control signals and the supply voltages for driving the electrical valves of the upper bridge arm and those of the lower bridge arm of the inverter can be read back. In this case, it has been shown to be particularly advantageous if the reading back of the supply voltages for driving the electrical valves of the upper bridge arm and those of the lower bridge arm of the inverter take place sequentially.

Safety may be further enhanced by utilizing an additional means for enforced dynamization of the setpoint value limitation, in particular of the setpoint stator frequency value, with which a respective test signal can be applied to the setpoint value for generating the sets of control signals in both systems; and the respectively generated limitation signals are compared, by crosswise data comparison.

DRAWINGS

Further advantages and details of the implementation of the invention are apparent from the following description of a preferred exemplary embodiment of the present invention and in connection with the corresponding figures, in which FIG. 1 shows a block diagram of a drive system with a drive controller with the "safe speed" function according to the invention;

FIG. 4 shows a block diagram of the internal structure of the two fault detecting means and their interconnection with the two systems of the drive controller.

DETAILED DESCRIPTION OF THE INVENTION

Figure 1:
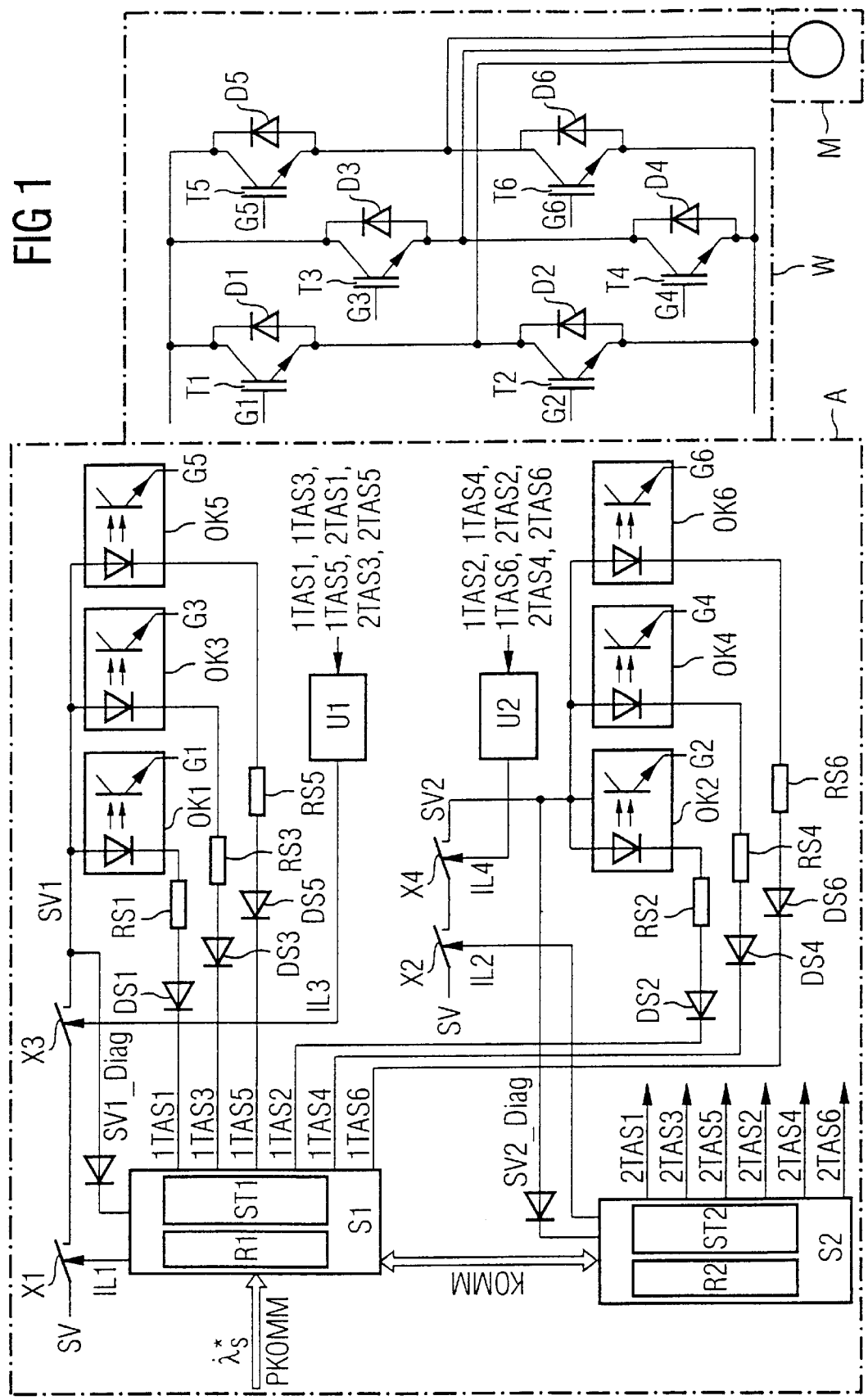

In FIG. 1, a technical implementation of the "safe speed" function is shown via a block diagram of a drive system with a drive controller for an asynchronous motor. The drive system is made up of a three-phase motor M, which is fed via an inverter W with IGBT transistors T1 to T6 as electrical valves, arranged in a bridge connection. Each transistor T1 to T6 has a freewheeling diode D1 to D6 and is driven by respective gate signals G1 to G6 of the drive controller A.

The drive controller A has two systems S1 and S2, via which the inverter W, and consequently the three-phase motor M, are operated. Each system S1 and S2 has intelligence, for example in the form of a microprocessor, microcontroller or a corresponding application-specific integrated circuit ASIC. In the control unit ST1 and ST2, which is respectively assigned to a system S1 or S2, but which may also be autonomous, transistor driving signals lTAS1 to lTAS6 for system S1 and 2TAS1 to 2TAS6 for system S2 are calculated.

In FIG. 1, the transistor driving signals lTAS1 to lTAS6 are provided via assigned optocouplers OK1 to OK6 as gate signals G1 to G6 and are transferred to the power transistors T1 to T6. Each photodiode of an optocoupler is connected on the anode side to the assigned supply voltage SV1 or SV2 and on the cathode side via a downstream resistor RS1 to RS6 and a forward-biased further diode DS1 to DS6 to the control unit ST1 of the system S1. The system S2 can also undertake this function instead of system S1. FIG. 1 further shows that the driving signal lTAS1 to lTAS6 only biases the associated power transistor T1 to T6 into conduction each time the driving signal assumes a low level (negative logic).

Apart from the inverter W for driving a motor M, the drive system according to the embodiment in FIG. 1 comprises the drive controller A which has the following system components:

A first system S1 with integrated closed-loop controller R1 and control unit ST1, power transistors T1–T6 driven by means of the control unit ST1, the transistor driving signals lTAS1 to lTAS6 and the optocouplers OK1–OK6, a voltage supply SV1 for the optocouplers for driving the upper transistors T1, T3 and T5, and a voltage supply SV2 for the optocouplers for driving the lower transistors T2, T4 and T6.

A second system S2 with integrated redundant components R2 with respect to the closed-loop controller R1 and its own control unit ST2. The transistor driving signals 2TAS1 to 2TAS6 are generated in a corresponding manner by means of the control unit ST2.

A communication interface KOMM for data exchange between system S1 and system S2.

A peripheral interface PKOMM, by which a setpoint speed value $\lambda_S^*$ is prescribed for the system S1 by a higher-level controller.

In addition to the above, first monitoring electronics U1 and second monitoring electronics U2 are of importance for fault detection. The transistor driving signals lTAS1, lTAS3, lTAS5 and 2TAS1, 2TAS3, 2TAS5 are connected to the monitoring electronics U1. The transistor driving signals lTAS2, lTAS4, lTAS6 and 2TAS2, 2TAS4, 2TAS6 are connected to the monitoring electronics U2. The outputs of the two systems of monitoring electronics U1, U2 provide signals IL3 and IL4. If a fault is detected, the signals switch the switches X3 and X4 (of a mechanical or else electronic type), whereby the supply voltages SV1 and SV2 for the optocouplers OK1 to OK6 obtained from a common external supply voltage SV are safely switched off.

To provide a "safe stopping" function, switches X1 and X2 are provided. The "safe stopping" function is likewise implemented by a pulse inhibit when the power transistors T1 to T6 of the inverter W are switched off operationally or in the event of a fault. If a fault is being detected by the monitoring electronics U1, U2 with the signals IL3 and IL4, the pulse inhibit preferably takes place by interrupting the supply voltage SV1, (derived from an external voltage SV), for the optocouplers OK1, OK3 and OK5 for the upper bridge arm of power transistors via switch X1 (of a mechanical or else electronic type) with the signal IL1 in system S1, and further interrupting the supply voltage SV2 for the optocouplers OK2, OK4 and OK6 for the lower bridge arm via a switch X2 with the signal IL2 in the system S2. A pulse inhibit may additionally be possible in the control unit ST.

Figure 2:
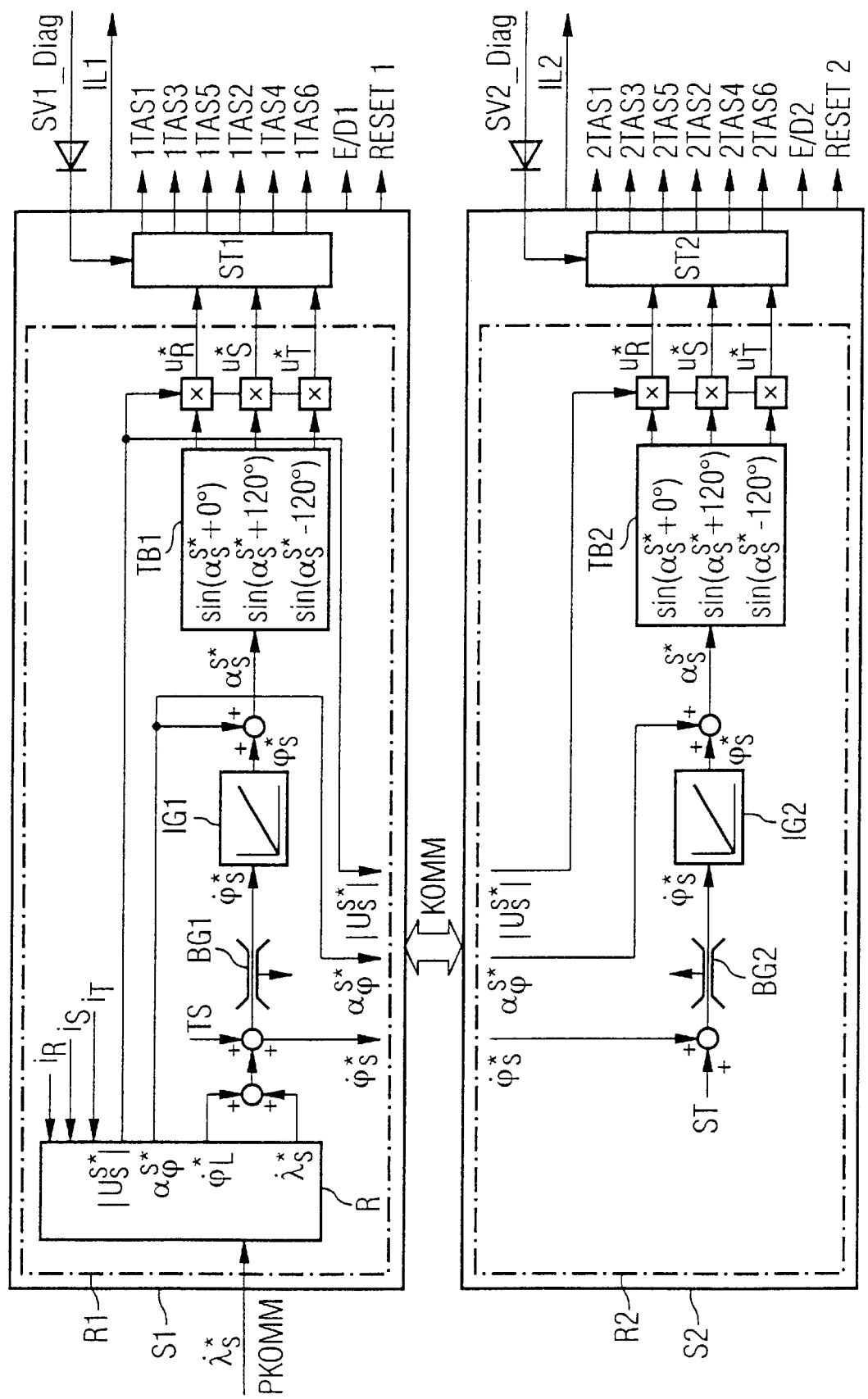
FIG. 2 shows a block diagram of the internal structure of the two systems of this drive system.

In the systems S1 and S2 shown in FIG. 2, including the variables processed in them, the following indexing applies for the physical designations:

A superscripted index letter denotes the physical variable (vector):
S=stator, L=rotor,*=setpoint value.
Example: $u^S$ . . . stator voltage;

A subscripted index (letter) denotes the system of coordinates:
S=stator, φ=rotor flux.
Example: $i^S\phi$=stator current in the rotor flux system of coordinates; and A subscripted index (number) indicates the direction of the transformed vector component:

1=in the direction of the x-axis, 2=in the direction of the y-axis. Example: $u^S_{\varphi 2}$=setpoint stator voltage value component in the rotor flux system of coordinates perpendicular to the rotor flux axis.

The system S1 comprises a closed-loop control unit R1 with an arithmetical and logical unit R and also a control unit ST1. The setpoint speed value $\lambda_S^*$ is [lacuna] by means of a higher-level controller (not shown). A closed-loop speed controller (not shown) is integrated in the arithmetical and logical unit R. The actual speed value $\lambda_S$, the setpoint slip frequency value $\varphi_L^*$, the setpoint stator voltage value $|U^{S^*}_S|$ and the load angle in the rotor flux system of coordinates $\alpha_\varphi^{S^*}$ are calculated in the arithmetical and logical unit R with knowledge of the motor data and measurement of the phase currents $i_R$, $i_S$, $i_T$.

The setpoint stator frequency value $\varphi_S^*$ is determined by addition of the actual speed value $\lambda_S$ and setpoint slip frequency value $\varphi_L^*$. This serves for the further processing in the closed-loop controller R1 and is transferred to the system S2 via the communication interface KOMM. For the case of a synchronous motor, the respective slip frequency values are equal to zero for system-related reasons.

The integration IG1 of the setpoint stator frequency value $\varphi_S^*$ in the closed-loop controller R1 produces the angle $\varphi_S^*$ rotating with the stator frequency. Addition of the load angle $\alpha_\varphi^{S^*}$ to the angle $\varphi_S^*$ obtains the angle $\alpha^{S^*}_S$ required for field-oriented operation in the stator system of coordinates. The angle $\alpha^{S^*}_S$ and the setpoint voltage value $|U^{S^*}_S|$ are then the manipulated variables for a controller of the induction machine M in the field-oriented operation. The three sinusoidal variables offset by 120°, sin ($\alpha^{S^*}_S$+0°), sin($\alpha^{S^*}_S$+ 120°) and sin($\alpha^{S^*}_S$+120°) are obtained using a sine table TB1.

Figure 3:
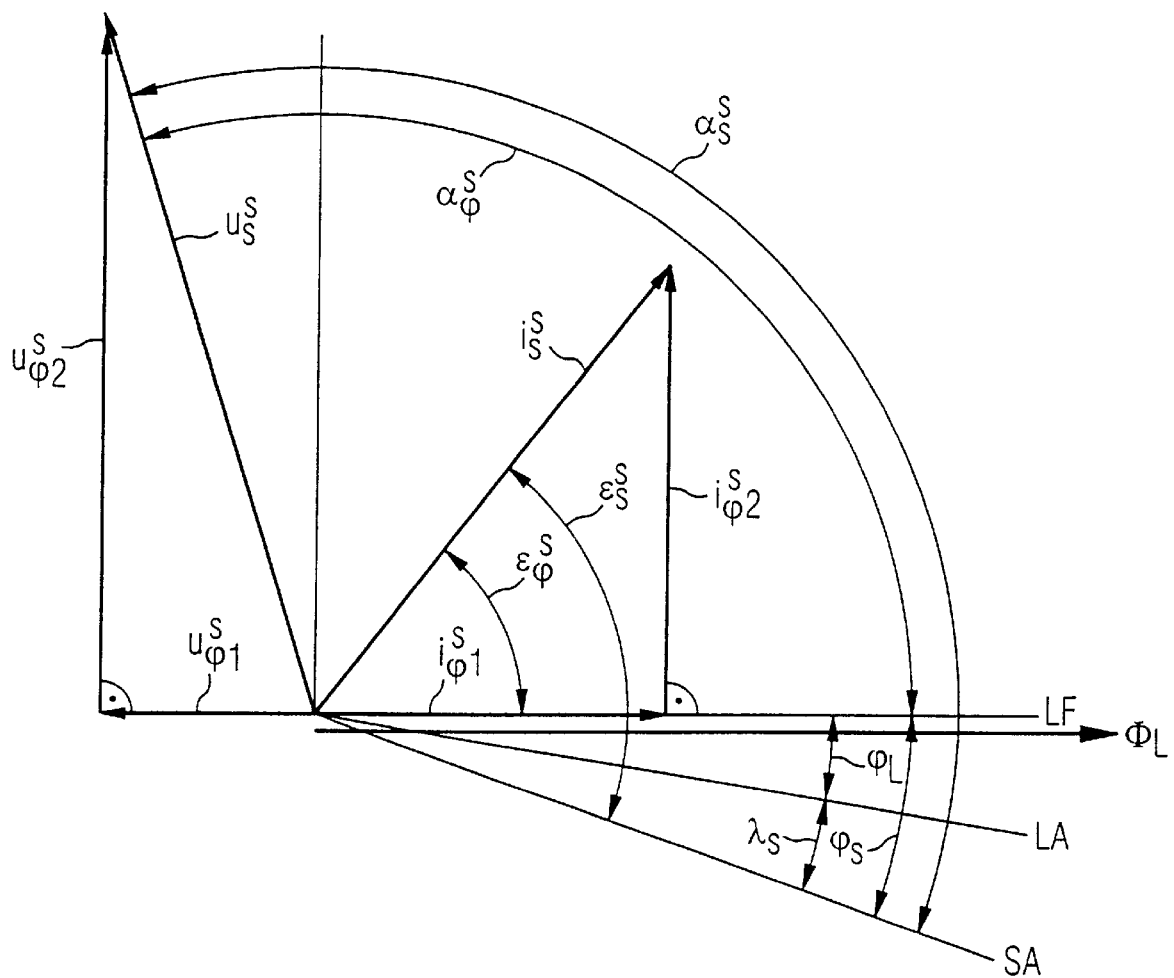
FIG. 3 shows a vector diagram for illustrating the drive-control parameters determined or processed in the respective closed-loop controller.

The respective multiplication x of these sinusoidal variables by the setpoint voltage value $|U^{S^*}_S|$ finally gives the setpoint phase voltage values $U_R^*$, $U_S^*$ and $U_T^*$ for driving the control unit ST1. The setpoint phase voltage values $U_R^*$, $U_S^*$ and $U_T^*$, pulse-width-modulated in the control unit ST1, give the transistor driving signals 1TAS1–1TAS6 for the inverter. The mathematical relationship described is also graphically revealed by the vector diagram shown in FIG. 3 with the rotor flux axis LF, the rotor axis LA displaced by the angle $\varphi_L$ and the stator axis SA displaced by the further angle $\lambda_S$.

Disregarding the slip frequency in the case of asynchronous machines, the rotational speed is determined exclusively by the stator frequency or the setpoint stator frequency value $\varphi_S^*$. It is therefore advisable to limit and/or monitor the setpoint stator frequency value in a two-channel mode. For system S1, this takes place in a first limitation BG1, (for system S2 it takes place in a correspondingly limitation BG2). This however does not lead as yet to the "safe speed" function, since faults in the path to the transistor control signal formation, as described above, can lead to improperly conducted movements of the motor M. Therefore, the setpoint frequency value $\varphi_S^*$ from system S1 is transferred to the system S2.

As already mentioned, the system S2 receives the setpoint stator frequency value $\varphi_S^*$ along with the other variable, i.e., the setpoint stator voltage value $|U^{S^*}_S|$ and the load angle in the rotor flux system of coordinates $\alpha_\varphi^{S^*}$, via the communication interface KOMM. In system S2, the setpoint stator frequency value $\varphi_S^*$ is also limited and monitored by a limitation BG2, by components R2 which are redundant with the exception of the arithmetical and logical unit R for the closed-loop control unit R1. With the same operations (IG2, TB2, x), transistor driving signals 2TAS1 to 2TAS6 that are identical to system S1 are generated during trouble-free operation in system S2 with the aid of the setpoint voltage value $|U^{S^*}_S|$ and load angle in the rotor flux system of coordinates $\alpha_\varphi^{S^*}$ transferred from system S1 to system S2.

The following should be noted with regard to setpoint voltage value $|U^{S^*}_S|$. The stator current in the motor M is determined primarily by the setpoint voltage value or the stator voltage amplitude. A single-channel fault in the formation of the setpoint voltage value consequently leads only to a higher or lower machine current and consequently to a higher or lower torque. This means that it does not as yet provide a way of coping with the case of a sagging load (for example in the case of a crane or elevator). The safety function for safe speed monitoring does not have an effect in the case of drives involving a sagging load. In the case of a motor with an integrated sensor, on the other hand, the speed is detected even when the machine is tilted and external braking devices can then be activated.

As can be seen in FIG. 4, the transistor driving signals 1TAS1, 1TAS3, 1TAS5, supplied by the system S1, are compared with the corresponding signals 2TAS1, 2TAS3, 2TAS5, supplied by the system S2, in the monitoring electronics U1 by means of respective logical exclusive-OR operations XOR1, XOR3, XOR5, and are combined by means of a logical OR gate O1 to form a cumulative fault signal F1, which is present across a voltage divider comprising a resistor RS10 and a capacitance C1 (glitch filter) at the latch FF1. If the pulse patterns of corresponding driving signals do not coincide, a latch FF1 is set with the output signal L3 via the fault signal F1 and the supply voltage SV1 for the upper transistor-driving optocouplers OK1, OK3, OK5 is switched off by means of the switch X3.

In the monitoring electronics U2, the transistor driving signals 1TAS2, 1TAS4, 1TAS6 and 2TAS2, 2TAS4, 2TAS6 are compared with one another and combined via a logical OR gate 02 to form a cumulative fault signal F2, which is present across a voltage divider comprising a resistor RS11 and a capacitance C2 (likewise as a glitch filter) at the latch FF2. If one or more pulse patterns of corresponding driving signals do not coincide, a further latch FF2 is set with the output signal ILA via the fault signal F2 and the supply voltage SV2 for the lower transistor-driving optocouplers OK2, OK4, OK6 is switched off by means of the switch X4. The fault detection implemented in this way is very sensitive and almost delay-free.

The functional capability of the two two-channel pulse inhibiting paths with the switches X1 and X2 and also X3 and X4 can be cyclically checked and consequently can be subjected to enforced dynamization, for example after each time the supply voltage is switched on. For this purpose, after actuation of the switches X1 and X3, the supply voltage SV1 is read back via the signal SV1_Diag respectively picked off downstream of the switches X1 and X3, and for the supply voltage SV2 via the signal SV2_Diag, in the respective system S1 or S2 actuating the switch X2, X4. That is to say, in the event of failure of one system S1 or S2, the functionally capable other system can always still respond, since even what are known as sleeping faults are discovered by the enforced dynamization.

For the corresponding enforced dynamization of the switching-off path with the signals IL3 and ILA via the switches X3 and X4, an interference signal ST is generated online or offline in the system S2 and applied to the setpoint frequency value $\varphi_S^*$ in the system. The checking of the switching-off paths takes place in turn by reading back the signals SV1_Diag and SV2_Diag. The checking should take place sequentially, since in fault stimulation both systems of monitoring electronics U1, U2 respond simultaneously. For this purpose, the respective latches FF1 and FF2 can be blocked. This takes place via corresponding control signals E/D1 from system S1 and E/D2 from system S2. After the enforced dynamization, the latches FF1, FF2 are reactivated via respective reset inputs with respective signals RESET1 and RESET2.

This checking preferably takes place after each time the supply voltage is switched on, or in a constant time cycle, such as, for instance, an eight-hour cycle (if the process allows this). The signal SV1_Diag additionally brings about a pulse inhibit in the inverter control unit ST1. That is to say, no hazardous movements can occur at the motor M. The function of the switches X1 to X4 can be checked by the signals SV1_Diag and SV2_Diag.

The setpoint frequency value limitations BG1 and BG2 can likewise be subjected to enforced dynamization. For this purpose, a test signal TS is applied to the setpoint frequency value for both systems S1 and S2. Both limitations must limit the same value or generate a response signal of BG1 and BG2. This checking preferably takes place after each time the supply voltage is switched on or in a constant time cycle, such as, for instance, an eight-hour cycle (if the process allows this) and crosswise between the systems S1 and S2 by crosswise data comparison.

If a setpoint frequency value that leads to the simultaneous response of the limitations BG1 and BG2 is generated during operation, the motor M is shut down in the best way possible, a warning is issued and re-switching-on is prevented. The user can then investigate why, for example, a higher setpoint speed value was prescribed by the controller in the "safe speed" mode. If only one monitor responds, pulse suppression is immediately triggered.

Consequently, with this drive controller according to the present invention, the following further advantages over the prior art can be achieved:
- no sensor system for speed sensing is required for the "safe speed" function;
- the circuit can be subjected to enforced dynamization;
- the second system S2, including the two systems of monitoring electronics U1, U2, can be optionally marketed;
- the costs for the second system S2, including the two systems of monitoring electronics U1, U2, are significantly lower than a sensor system with attachment and sensor line;
- the fault detection takes place virtually without any time delay (glitch filter<100 µs);
- the fault tolerance is extremely low; and
- the "safe speed" function can be used in the case of all induction machines without a sensor system.

In addition to the implementation of the combination logic of the systems of monitoring electronics U1, U2 described in the exemplary embodiment using the elements XOR1 to XOR6, O1, O2, RS10, RS11, C1, C2, FF1 and FF2, alternative embodiments of the fault detecting means of the present invention can also be used, while retaining the functionality. In particular, any other assignments of corresponding driving signals can also be chosen for the systems of monitoring electronics U1, U2. This also applies to driving the control unit ST with positive logic. It is similarly possible to connect all the switches X1 to X4 in series, in order to switch off the power supply for all optocouplers OK1 to OK6 in this way (also in a two-channel mode).

The two systems S1 and S2 can be implemented both in software (for example by an ASIC) and by a suitably programmed microprocessor or microcontroller.

I claim:

1. A drive controller for a three-phase motor comprising an inverter having electrical valves, said inverter comprising a first and a second system for generating a first set and redundant second set of control signals, the first system has a setpoint speed value applied to it for generating the first set of control signals, which can be provided to the second system via a communication interface for generating the second set of control signals, wherein the setpoint frequency value in the first and/or second system can be limited and/or monitored by at least two fault detecting means for monitoring the first and second set of control signals and further wherein a subset of control signals corresponding to the first and second sets of control signals are compared with one another in a first fault detector and a subset of control signals to be the corresponding remaining control signals of the first and second sets of control signals are compared with one another in a second fault detector, and wherein the electrical valves of the inverter can be switched off in a two-channel mode by the respective fault detectors in the event of a deviation in the compared sets of control signals.

2. The drive controller according to claim 1, wherein the electrical valves of the inverter are in bridge connection having an upper and lower bridge arm, and wherein if a deviation occurs, the pulses for the upper bridge arm of electrical valves can be inhibited by one fault detector and pulses to the lower bridge arm of electrical valves can be inhibited by the other fault detector.

3. The drive controller according to claim 1, wherein the setpoint frequency value is a setpoint stator frequency value.

4. The drive controller according to claim 3, for use in a synchronous motor, wherein the first system to which the setpoint speed value is applied further comprises an arithmetical and logical means with an integrated speed controller which supplies the setpoint stator frequency value, setpoint stator voltage value and load angle in a rotor flux system of coordinates and from which setpoint phase voltage values can be generated by means of closed-loop control components for the two systems for driving the control units for generating the control signals.

5. The drive controller according to claim 3, for use in an asynchronous motor, wherein the first system to which the setpoint speed value is applied further comprises an arithmetical and logical means with an integrated speed controller, which supplies the setpoint stator frequency value, setpoint slip frequency value, setpoint stator voltage value and load angle in a rotor flux system of coordinates, and from which setpoint phase voltage values can be generated by means of respective closed-loop control components of the two systems for driving the control units for generating the control signals.

6. The drive controller according to claim 2, wherein the first fault detector monitors the corresponding control signals for the electrical valves of the upper bridge arm and the second fault detector monitors the corresponding control signals for the electrical valves of the lower bridge arm.

7. The drive controller according to claim 1, wherein each fault detector performs a logic exclusive-OR operation on corresponding control signals to be monitored for the electrical valves and logically combines the results to form a cumulative fault signal.

8. The drive controller according to claim 1, wherein only one set of control signals drives the electrical valves of the inverter.

9. The drive controller according to claims 1 and 2, wherein optocouplers control signals to the electrical valves and a fault detector enables the interruption of a supply voltage to the in the event of a fault.

10. The drive controller according to claim 9, wherein the optocouplers transmit control signals to the electrical valves and a fault detector enables the interruption of a supply voltage to the optocouplers associated with the upper or lower bridge arm in the event of a fault.

11. The drive controller according to claim 2, further comprising a means for enforced dynamization of at least two pulse inhibiting paths to which an interference signal can be applied to the setpoint value for generating the sets of control signals and wherein supply voltages for driving the electrical valves of the upper bridge arm and those of the lower bridge arm of the inverter can be read back.

12. The drive controller according to claim 11, wherein the supply voltages are read back sequentially.

13. The drive controller according to claim 1, further comprising means for enforced dynamization of the setpoint value limitation, wherein a test signal is applied to the setpoint value for generating the sets of control signals and generated limitation signals for comparison.

14. The drive controller according to claim 13, wherein the value limitation is the setpoint stator frequency value and the comparison is a crosswise data comparison.

* * * * *